United States Patent
Ono

(10) Patent No.: US 7,440,400 B2
(45) Date of Patent: Oct. 21, 2008

(54) TRANSFER APPARATUS

(75) Inventor: Tachio Ono, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 533 days.

(21) Appl. No.: 11/044,148

(22) Filed: Jan. 27, 2005

(65) Prior Publication Data

US 2005/0180732 A1   Aug. 18, 2005

(30) Foreign Application Priority Data

Feb. 2, 2004   (JP)   ............................. 2004-026142

(51) Int. Cl.
*H04J 1/16* (2006.01)
*H04J 3/14* (2006.01)
*H04L 12/26* (2006.01)
*H04L 12/28* (2006.01)

(52) U.S. Cl. ................... 370/230; 370/230.1; 370/231; 370/232; 370/235

(58) Field of Classification Search .............. 370/230, 370/230.1, 231, 232, 235
See application file for complete search history.

(56) References Cited

U.S. PATENT DOCUMENTS 7,167,449 B2 * 1/2007 Ikeda et al. ................. 370/235
2004/0240453 A1 * 12/2004 Ikeda et al. ............ 370/395.21

FOREIGN PATENT DOCUMENTS

JP   2001-282713 A   10/2001

OTHER PUBLICATIONS

Standard ISO/IEC 13818-1: Information technology—Generic coding of moving pictures and associated audio information: Systems. http://www.iso.org/iso/en/CatalogueDetailPage.CatalogueDetail?CSNUMBER=31537&ICS1=35&ICS2=40&ICS3=, 2000.
IEEE-1394 Standard, 2000.
Universal Serial Bus Specification Revision 2.0 Apr. 27, 2000 http://www.usb.org/developers/docs/ , 2000.
IEC 61883-1, Consumer audio/video equipment—Digital interface—Part 1: General, First edition 1998-02, pp. 1-83.
IEC 61883-4, Consumer audio/video equipment—Digital interface—Part 4: MPEG2-TS data transmission, First edition Feb. 1998, pp. 1-23.

* cited by examiner

*Primary Examiner*—Chau Nguyen
*Assistant Examiner*—Blanche Wong
(74) *Attorney, Agent, or Firm*—Canon U.S.A. Inc., I. P. Division

(57) ABSTRACT

A transfer apparatus detects first time adjustment information from a first transport stream (TS) packet included in an MPEG-2 transport stream, and detects second time adjustment information from a second TS packet included in the MPEG-2 transport stream. The transfer apparatus calculates a time interval between the first time adjustment information and the second time adjustment information. The transfer apparatus performs a recalculation to change the calculated time interval to a recalculated time interval. The transfer apparatus calculates transmission timing of the first TS packet and TS packets between the first and second TS packets, in accordance with the recalculated time interval. The transfer apparatus transfers the first TS packet and the TS packets between the first and second TS packets, in accordance with the calculated transmission timing.

12 Claims, 6 Drawing Sheets

```
struct{
  pktType;              ~1001-1
  uSOF;                 ~1001-2
}TimTable[Num_MicroFrm(i)];          ~1001
Crnt_sof=GET_CUR_uSOF();             ~1002

X=0;                  ~1003
For(N=0;N<Num_MicroFrm(i);N++)       ~1004
{
  X=X+NumOfTranspktB(i);             ~1005
  If(X>=Num_MicroFrm(i))             ~1006
  {
    X=X-Num_MicroFrm(i);             ~1007
    TimTable[N].pktType=TransPktB(i);  ~1008
  }else{
    TimTable[N].pktType=TransPktA(i);  ~1009
  }
  TimTable[N].uSOF=N+Crnt_sof+delay;  ~1010
}
ADD_CUR_uSOF(Num_MicroFrm(i));       ~1011
```

TRANSFER APPARATUS

BACKGROUND OF THE INVENTION

1. Field of the Invention

The present invention relates to a transfer apparatus, etc., for transferring a data stream such as an MPEG-2 transport stream.

2. Description of Related Art

Presently, an MPEG-2 transport stream (hereinafter referred to as the "MPEG2TS") is known as an example of a data stream, as defined in standard ISO/IEC 13818-1: Information technology—Generic coding of moving pictures and associated audio information: Systems. The MPEG2TS is comprised of transport stream (TS) packets of 188 bytes in length.

Furthermore, a transfer apparatus configured to transfer an MPEG2TS using the IEEE 1394 standard is also known at present, as disclosed, for example, in Japanese Laid-Open Patent Application No. 2001-282713.

Moreover, using the IEC 61883 standard when transferring an MPEG2TS using the IEEE 1394 standard is also known, as defined, for example, in standard IEC 61883-1, Consumer audio/video equipment—Digital interface—Part 1: General, and standard IEC 61883-4, Consumer audio/video equipment—Digital interface—Part 4: MPEG2-TS data transmission. In the standard IEC 61883-1, Consumer audio/video equipment—Digital interface—Part 1: General, the data format of a common isochronous packet (CIP) header is defined. In the standard IEC 61883-4, Consumer audio/video equipment—Digital interface—Part 4: MPEG2-TS data transmission, the data format of a source packet header (SPH) is defined. FIG. 1 shows the data format of the CIP header. FIG. 2 shows the data format of the SPH. In FIG. 2, a CYCLE_COUNT field 201 (13 bits) serves as an 8-kHz counter. A CYCLE_OFFSET field 202 stores an offset value. The SPH is used to adjust the timing for inputting each TS packet to an MPEG2TS codec (coder decoder).

In a communication system using both the IEEE 1394 standard and the IEC 61883 standard, transferring TS packets is controlled according to the SPH and a program clock reference (PCR), as shown in lines A to C in FIG. 3.

In the line A in FIG. 3, TS packets 301 and 302 each are a TS packet having a PCR. The PCR is information for adjusting a time interval. As shown in FIG. 4, the PCR has a Program_clock_reference_base field 401 (33 bits) serving as a 90-kHz counter and a Program_clock_reference_extension field 402 (6 bits) serving as a 27-MHz counter. The time interval between the TS packets 301 and 302 corresponds to a difference in value between a PCR included in the TS packet 301 and a PCR included in the TS packet 302.

In the line B in FIG. 3, the TS packet 301 is transferred onto an IEEE 1394 serial bus at the timing indicated by a TS packet 303. The TS packet 302 is transferred onto the IEEE 1394 serial bus at the timing indicated by a TS packet 304. In this instance, the time interval between the TS packets 303 and 304 is adjusted and changed to an integral multiple of 125 μs (microsecond). In this case, an SPH that is generated according to the PCR value is added to each TS packet.

In the line C in FIG. 3, a transfer apparatus on the receiving end adjusts the time interval between the TS packets 305 and 306 by the use of the SPH to become equal to the time interval between the TS packets 301 and 302.

However, the above-described configuration necessitates a large-sized buffer for eliminating a time lag by the use of the SPH (buffer memory for timing adjustment). This increases production cost of the transfer apparatus on the receiving end.

SUMMARY OF THE INVENTION

An aspect of the present invention is to overcome the above-described drawbacks.

Another aspect of the present invention is to enable a small-sized buffer memory to be used for timing adjustment, thereby lowering production cost of a transfer apparatus on the receiving end.

In an aspect of the present invention, a transfer apparatus comprises a transfer unit configured to transfer a data stream containing time adjustment information using a transfer method of transferring predetermined-sized data at a predetermined time interval, and a conversion unit configured to convert the time adjustment information into converted time adjustment information according to the time interval in the transfer method, wherein the transfer unit transfers the data stream according to the converted time adjustment information.

In another aspect of the present invention, a method for use with a transfer apparatus comprises steps of transferring a data stream containing time adjustment information using a transfer method of transferring predetermined-sized data at a predetermined time interval, and converting the time adjustment information into converted time adjustment information according to the time interval in the transfer method, wherein the transferring step includes a step of transferring the data stream according to the converted time adjustment information.

Other features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Embodiments of the invention will be described in detail below with reference to the drawings.

Figure 1:
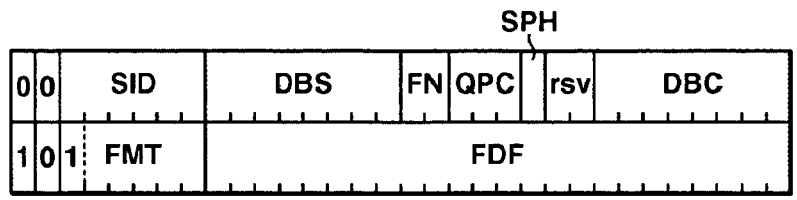
FIG. 1 is diagram showing the data format of a CIP header.
Figure 2:
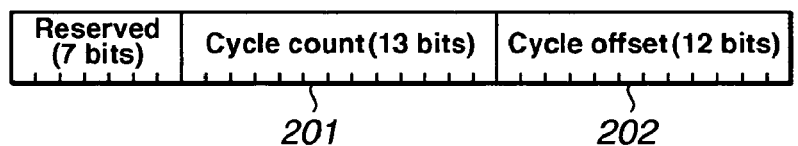
FIG. 2 is a diagram showing the data format of an SPH.
Figure 3:
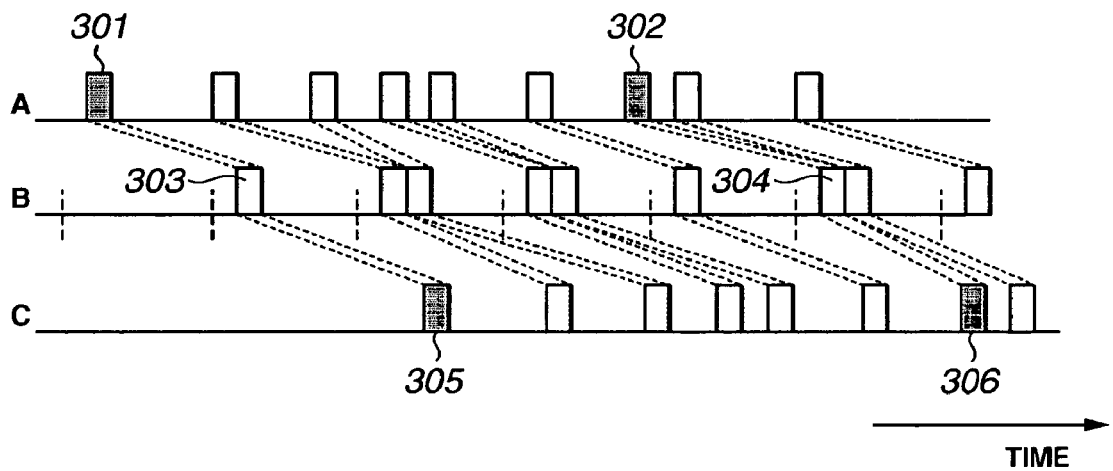
FIG. 3 is a diagram illustrating a method for transferring TS packets in a communication system using the IEEE 1394 standard and the IEC 61883 standard.
Figure 4:
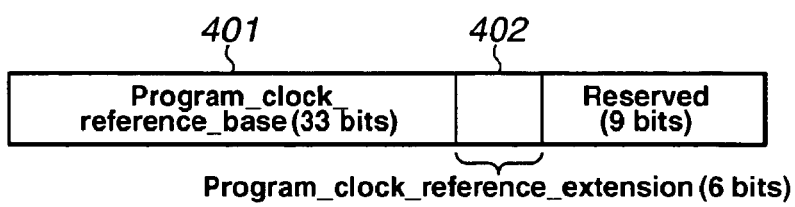
FIG. 4 is a diagram showing the data format of a PCR field contained in an MPEG2TS header.
Figure 5:
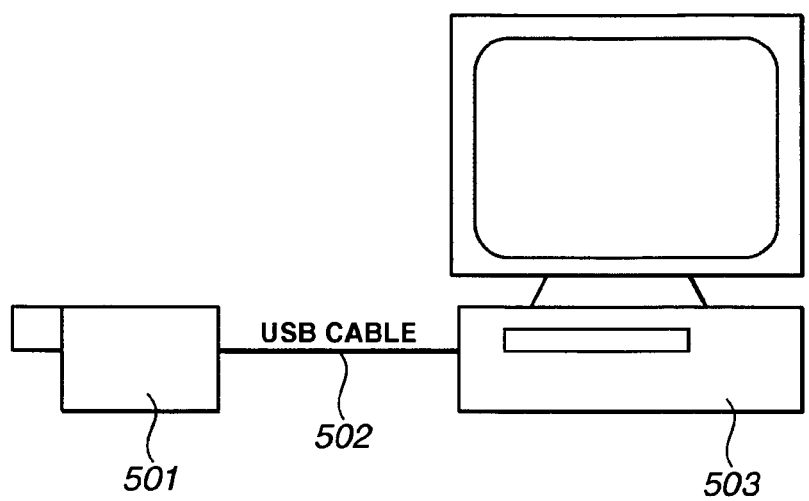
FIG. 5 is a diagram showing essential components of a data transfer system according to an exemplary embodiment of the invention.

FIG. 5 is a diagram showing essential components of a data transfer system according to an exemplary embodiment of the invention. The data transfer system is configured to transfer an MPEG2TS (a transport stream defined by the MPEG-2 system), which is an example of a data stream, using isochronous transfer as defined in USB (Universal Serial Bus). USB is described in Universal Serial Bus Specification Revision 2.0, Apr. 27, 2000.

In FIG. 5, the data transfer system includes a digital video camera (DVC) 501 and a personal computer (PC) 503. The DVC 501 is an example of a transfer apparatus on the receiving end. The PC 503 is an example of a transfer apparatus on the transmitting end. Each of the DVC 501 and the PC 503 has a communication interface portion compliant with USB. Accordingly, each of the DVC 501 and the PC 503 supports isochronous transfer, which is a transfer method for transferring predetermined-sized data at a predetermined time interval (125 µs). The PC 503 serves as a host defined by USB, and the DVC 501 serves as a device defined by USB. A USB cable 502 is a communication cable for connecting the DVC 501 and the PC 503.

Figure 9:
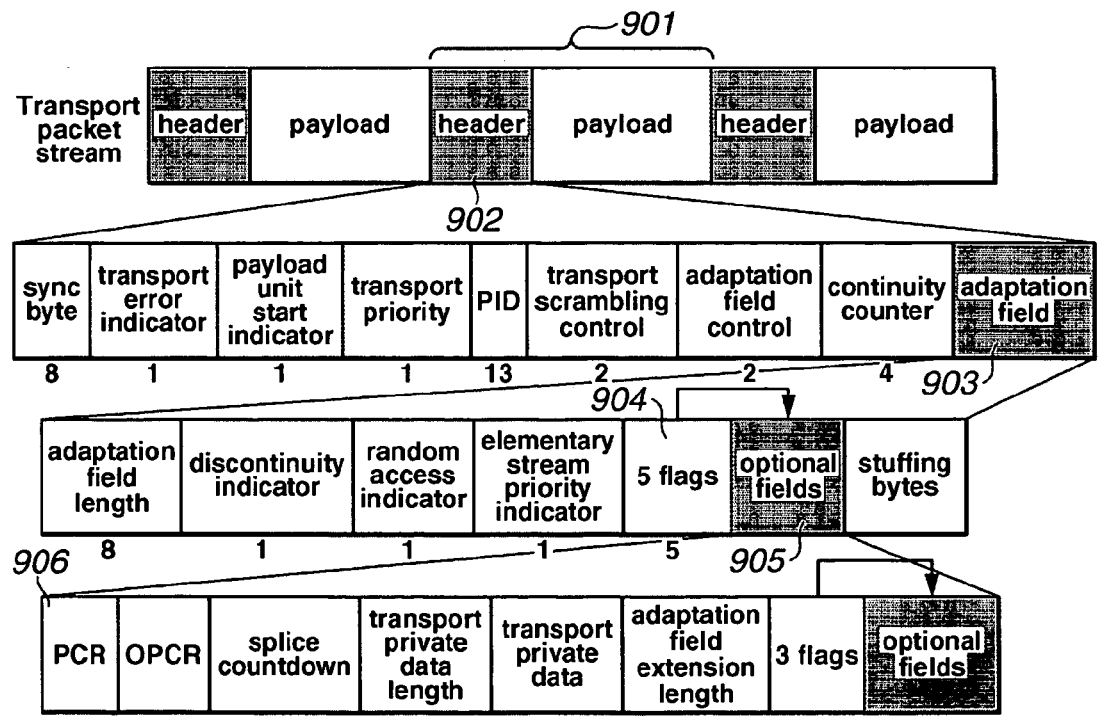
FIG. 9 is a diagram schematically showing the data format of a header contained in an MPEG2TS.

FIG. 9 is a diagram showing the data format of an MPEG2TS. In FIG. 9, a TS packet 901 contains a header 902. The MPEG2TS is comprised of a plurality of TS packets, as shown in FIG. 9. The TS packet header 902 contains an adaptation field 903. The adaptation field 903 contains a 5-flags field 904 and optional fields 905. The optional fields 905 contain a PCR field 906. The PCR field 906 stores a PCR (program clock reference).

Figure 6:
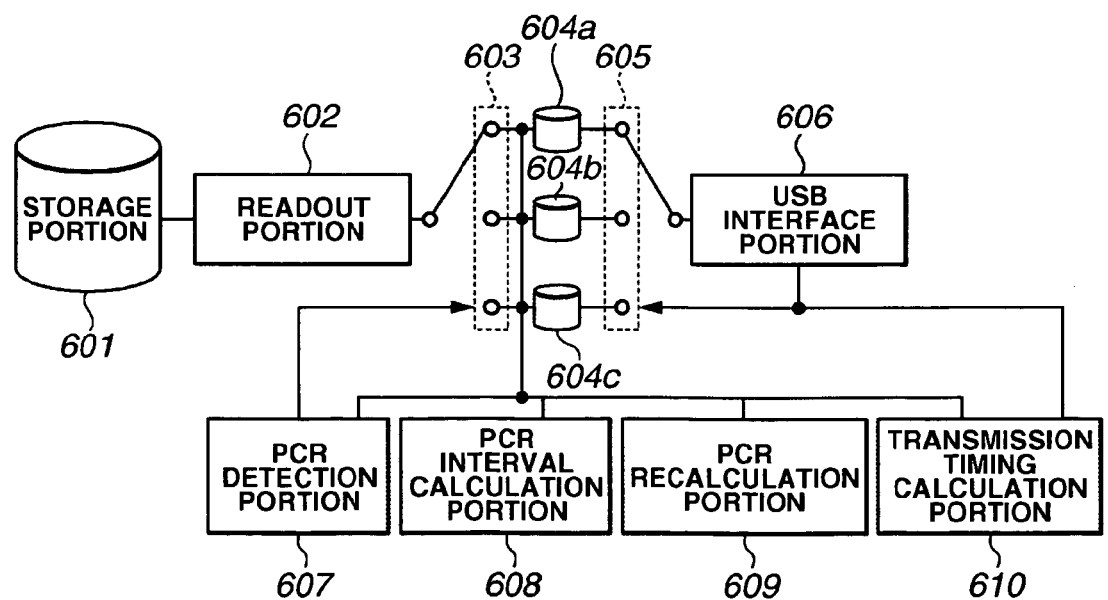
FIG. 6 is a diagram showing essential components of a transfer apparatus on the transmitting end according to the embodiment of the invention.

FIG. 6 is a diagram showing essential components of the PC 503, which is an example of a transfer apparatus on the transmitting end according to the embodiment of the invention. Each essential component of the PC 503 can be configured by hardware or software. A storage portion 601, which is, for example, a hard disk device, stores an MPEG2TS, which is an example of a data stream.

A readout portion 602 reads every TS packet (188 bytes) of the MPEG2TS from the storage portion 601.

Buffers 604a, 604b and 604c temporarily store TS packets read from the storage portion 601. Two buffers or more than three buffers may be employed instead of the three buffers 604a, 604b and 604c.

Buffer selection portion 603 and 605 select any one of the buffers 604a, 604b and 604c.

A USB interface portion 606 is a communication interface portion compliant with USB. The USB interface portion 606 transfers, via isochronous transfer, TS packets stored in the buffer selected by the second buffer selection portion 605. The USB interface portion 606 transfers TS packets according to timing designated by a transmission timing calculation portion 610.

A PCR detection portion 607 determines whether a TS packet read out by the readout portion 602 is a TS packet containing a PCR (program clock reference). If a TS packet read out by the readout portion 602 is a TS packet containing a PCR, the PCR detection portion 607 reads out the PCR of the TS packet and supplies the read PCR to a PCR interval calculation portion 608.

The PCR interval calculation portion 608 calculates a time interval between adjacent PCRs from time information indicated by each PCR, and supplies the calculated time interval to a PCR recalculation portion 609.

The PCR recalculation portion 609 performs recalculation to change a time interval calculated by the PCR interval calculation portion 608 to an integral multiple of one cycle (125 µs) of isochronous transfer.

The transmission timing calculation portion 610 calculates timing for transmitting each TS packet according to the time interval recalculated by the PCR recalculation portion 609, and supplies the calculated timing to the USB interface portion 606.

Figure 7:
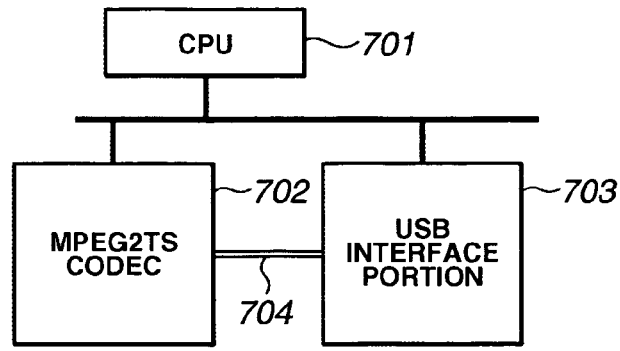
FIG. 7 is a diagram showing essential components of a transfer apparatus on the receiving end according to the embodiment of the invention.

FIG. 7 is a diagram showing essential components of the DVC 501, which is an example of a transfer apparatus on the receiving end. A central processing unit (CPU) 701 controls operation of the DVC 501.

An MPEG2TS codec (coder decoder) 702 performs encoding and decoding of an MPEG2TS.

A USB interface portion 703 is a communication interface portion compliant with USB. The USB interface portion 703 receives an MPEG2TS transmitted from the USB interface portion 606, and transfers the received MPEG2TS to the MPEG2TS codec 702.

A data bus 704 connects the USB interface portion 703 and the MPEG2TS codec 702. The data bus 704 has a transfer rate larger than that for an MPEG2TS.

Figure 8:
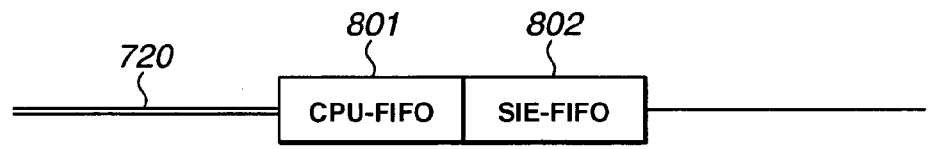
FIG. 8 is a diagram illustrating time adjustment processing that is performed at a USB interface portion included in the transfer apparatus on the receiving end according to the embodiment of the invention.

FIG. 8 is a diagram illustrating timing adjustment processing that is performed at the USB interface portion 703. An SIE-FIFO (serial interface engine—first-in first-out) 802 stores a TS packet transferred from the PC 503 via isochronous transfer. When having detected the end of a TS packet, the USB interface portion 703 transfers a TS packet stored in the SIE-FIFO 802 to a CPU-FIFO 801. In this regard, the USB interface portion 703 completes transfer from the SIE-FIFO 802 to the CPU-FIFO 801 before receiving the next uSOF (start of micro frame) packet from the PC 503, which serves as a host, and adjusts timing of transfer of each TS packet. The uSOF packet is data indicative of the beginning of a time interval of 125 µs and is used to adjust timing between the host and the device. This configuration decreases any deviation occurring within 125 µs. The USB interface portion 703 transfers a TS packet stored in the CPU-FIFO 801 to the MPEG2TS codec 702 at a time interval of 125 µs.

A transfer method for a data stream that is performed in the data transfer system shown in FIG. 5 is described below. The readout portion 602 reads every TS packet (188 bytes) of an MPEG2TS stored in the storage portion 601. The read 188-byte TS packet is then stored into the buffer 604a, 604b or 604c. The PCR detection portion 607 determines whether a PCR field 906 is present within the header 902 of the TS packet 901. If the PCR field 906 is present, the PCR detection portion 607 performs calculation based on the formula (1) using a PCR extracted from the PCR field 906:

$$PCR(i) = PCR\_base(i) * 300 + PCR\_ext(i) \quad (1)$$

where PCR_base(i) represents a program clock reference base (33 bits) contained in the PCR, and PCR_ext(i) represents a program clock reference extension (6 bits) contained in the PCR.

The readout portion 602 continues transferring TS packets read from the storage portion 601 to the buffer 604a until the PCR detection portion 607 detects a TS packet containing the next PCR.

When having detected a TS packet containing the next PCR, the PCR detection portion 607 stores the detected PCR into PCR(i+1) according to the formula (1). In this instance, the buffer selection portion 603 selects the buffer 604b in accordance with an instruction from the PCR detection portion 607. After that, if a TS packet containing the next PCR has been detected by the PCR detection portion 607, the buffer selection portion 603 selects the buffer 604c in accordance with an instruction from the PCR detection portion 607.

Figures 10, 11:
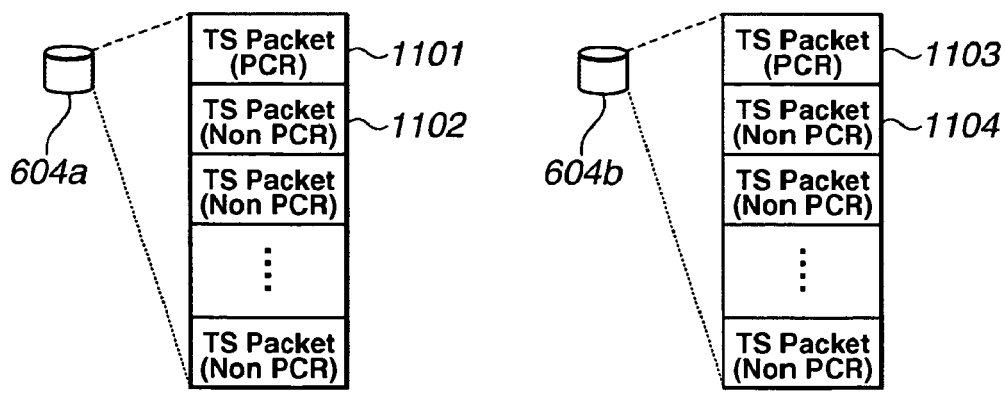
FIG. 10 is a diagram showing an example of a program for calculating timing of transmission of TS packets.
FIG. 11 is a diagram showing the state of TS packets that are stored in buffers.

FIG. 11 is a diagram illustrating the state of the buffers 604a and 604b. TS packets 1101 and 1103 each containing a PCR are stored in the heads of the buffers 604a and 604b, respectively. TS packets 1102 and 1104 each containing no PCR are stored in the subsequent areas of the buffers 604a and 604b, respectively. According to the above description, a PCR of the TS packet 1101 is stored in PCR(i), and a PCR of the TS packet 1103 is stored in PCR(i+1). Since a USB micro frame has a period of 125 μs, if each packet is transmitted in accordance with the USB micro frame, an error of less than 125 μs at a maximum may occur between a value between PCR(i) and PCR(i+1) and an actual transmission interval of TS packets each containing a PCR. As a result, this error causes a deviation of PCRs. In order to prevent this deviation, considering an error which may occur when a TS packet containing a PCR is actually transmitted on a transmission path, the PCR value should be modified to change a time interval between PCRs to an integral multiple of 125 μs. Accordingly, in order to obtain the modified PCR value, the PCR interval calculation portion 608 calculates a difference between PCR(i) and PCR(i+1).

$$\text{Intvl\_PCR}(i) = \text{PCR}(i+1) - \text{PCR}(i) \quad (2)$$

The PCR recalculation portion 609 performs recalculation to change the value of Intvl_PCR(i) to an integral multiple of one cycle (125 μs) of isochronous transfer defined by USB. This recalculation is performed using the formula (3):

$$\text{Smoothed\_Intvl\_PCR}(i) = \text{Intvl\_PCR}(i) - \text{MOD}(\text{Intvl\_PCR}(i), 3375) \quad (3)$$

where 3375 is a value obtained by converting 125 μs into a 27-MHz clock, and MOD ( ) represents a function for calculating a remainder.

Since the PCR value is expressed with a 27-MHz resolution, the value of Intvl_PCR(i) can be changed to an integral multiple of 125 μs.

CarriedError is a cumulative total of errors occurring when the value of Intvl_PCR(i) is changed to an integral multiple of 125 μs in the formula (3). CarriedError is calculated using the formula (4). In an initial state, CarriedError is 0.

$$\text{CarriedError} += \text{MOD}(\text{Intvl\_PCR}(i), 3375) \quad (4)$$

The PCR recalculation portion 609 generates a new PCR from the recalculated value using the formula (5) and rewrites the original PCR with the new PCR.

$$\text{New\_PCR}(i+1) = \text{PCR}(i) + \text{Smoothed\_Intvl\_PCR}(i) \quad (5)$$

Here, the time interval between PCR(i) and New_PCR(i+1) becomes an integral multiple of 125 μs.

In this instance, the PCR recalculation portion 609 needs to take into consideration a cumulative total of errors occurring when the time interval between PCR(i) and PCR(i+1) is changed to an integral multiple of 125 μs. If the equation (6) is satisfied (if the value of CarriedError is greater than 3375), the PCR recalculation portion 609 performs calculations using the formulae (7-1) and (7-2). Accordingly, the errors are corrected.

$$\text{CarriedError} \geq 3375 \quad (6)$$

$$\text{New\_PCR}(i+1) = \text{New\_PCR}(i+1) + 3375 \quad (7-1)$$

$$\text{CarriedError} -= 3375 \quad (7-2)$$

The value of the recalculated New_PCR(i+1) becomes the value of PCR (i+1). Then, the value of PCR (i+1) is used to correct PCR(i+2), which is the next PCR.

Timing for transmitting a TS packet containing PCR(i) and a TS packet containing PCR (i+1) is now described below. The transmission timing calculation portion 610 calculates the number of TS packets to be transmitted via each USB micro frame and the transmission timing thereof according to the total number Num_TS_PACKET(i) of TS packets from a TS packet containing PCR(i) to a TS packet just before a TS packet containing PCR(i+1) and the recalculated time interval (i.e., an integral multiple of 125 μs).

Num_MicroFrm(i) represents the number of USB micro frames existing during a period from transmitting a TS packet containing PCR(i) until transmitting a TS packet containing PCR(i+1). Num_MicroFrm(i) is calculated using the formula (8):

$$\text{Num\_MicroFrm}(i) = (\text{New\_PCR}(i+1) - \text{PCR}(i))/3375 \quad (8)$$

$$\text{TransPktA}(i) = (\text{INT})(\text{Num\_TS\_PACKET}(i)/\text{Num\_MicroFrm}(i)) \quad (9\text{-}1)$$

$$\text{TransPktB}(i) = \text{TransPktA}(i) + 1 \quad (9\text{-}2)$$

$$\text{NumOfTranspktB}(i) = \text{MOD}(\text{Num\_TS\_PACKET}(i), \text{Num\_MicroFrm}(i)) \quad (9\text{-}3)$$

$$\text{NumOfTranspktA}(i) = \text{Num\_MicroFrm}(i) - \text{NumOfTranspktB}(i) \quad (9\text{-}4)$$

where TransPktA(i) and TransPktB(i) each represent the number of TS packets to be transmitted via each USB micro frame during a period from transmitting a TS packet containing PCR(i) until transmitting a TS packet containing PCR(i+1).

INT ( ) in the formula (9-1) represents a function for disregarding digits after the decimal point. For example, if Num_TS_PACKET(i) is 30 and Num_MicroFrm(i) is 25, TransPktA(i) becomes 1 and TransPktB(i) becomes 2. Accordingly, USB micro frames during a period from transmitting a TS packet containing PCR(i) until transmitting a TS packet containing PCR(i+1) include a USB micro frame in which two TS packets are transmitted as one USB isochronous packet and a USB micro frame in which one TS packet is transmitted as one USB isochronous packet.

NumOfTranspktA(i) represents the number of times of transmission for TransPktA (i) during a period from transmitting a TS packet containing PCR(i) until transmitting a TS packet containing PCR(i+1). NumOfTranspktB(i) represents the number of times of transmission for TransPktB(i) during a period from transmitting a TS packet containing PCR(i) until transmitting a TS packet containing PCR(i+1). For example, if Num_TS_PACKET(i) is 30 and Num_MicroFrm (i) is 25, NumOfTranspktA(i) becomes 20 and NumOfTranspktB(i) becomes 5. Accordingly, in 25 USB micro frames during a period from transmitting a TS packet containing PCR(i) until transmitting a TS packet containing PCR(i+1), the number of times that one TS packet is transmitted within one USB micro frame is 20, and the number of times that two TS packets are transmitted within one USB micro frame is 5.

Timing for TransPktA(i) and TransPktB(i) is set according to the above values and a program shown in FIG. 10. In FIG. 10, TimTable 1001 is a table for designating data to be externally transferred via the USB interface portion 606. TimTable 1001 holds pktType 1001-1 and uSOF 1001-2 as members. pktType 1001-1 indicates how many TS packets are transmitted within each micro frame. As described above, TransPktA (i) or TransPktB(i) is set to pktType 1001-1. uSOF (start of micro frame) 1001-2 indicates by which micro frame a TS packet is transmitted. Accordingly, TimTable 1001 is a table for designating an interval at which a TS packet containing PCR(i) through a TS packet just before a TS packet containing PCR(i+1) are to be transmitted. A value given by GET_CUR_uSOF in step 1002 is the current value of an internal counter that increments count in response to every transmission of uSOF, which value is returned by a USB host controller. For convenience of explanation, a GET_CUR_uSOF function in step 1002 is assumed to return the value of the internal counter only at the time of the first calling after initialization and subsequently return only a value obtained by incrementing Num_MicroFrm(i) set by ADD_CUR_uSOF in step 1011.

X in step 1003 is a variable for calculation and is initialized to 0. Then, TimTable 1001 is created using a loop formula in step 1004. Here, Num_MicroFrm(i) represents the number of uSOF intervals, i.e., the total number of times of transmission, during a period from transmitting a TS packet containing PCR(i) until transmitting a TS packet just before a TS packet containing PCR(i+1). NumOfTranspktA(i) represents the number of times of TS packet transmission indicated by TransPktA(i). NumOfTranspktB(i) represents the number of times of TS packet transmission indicated by TransPktB(i). Processing from steps 1005 to 1009 is a logic example where TS packets for TransPktB(i) are transmitted the number of times indicated by NumOfTranspktB(i) among the total number of transmission Num_MicroFrm(i). This logic is not limited to that shown in FIG. 10. At step 1005, NumOfTranspktB (i) is added to X. TimTable is set such that TS packets for TransPktB(i) are transmitted only when X has become Num_MicroFrm(i) or greater at step 1006. Otherwise, TS packets for TransPktA(i) are transmitted. At step 1010, timing information for determining timing of transmission by the USB interface portion 606 is set with an internally-stored value of the internal register and a given delay taken into consideration. Thus, TimTable exactly designates, in units of 125 μs, timing for transmitting TS packet data temporarily stored in the buffer 604a, 604b or 604c. On the basis of TimTable created as described above, the USB interface portion 606 transmits each TS packet according to the designated timing, i.e., members uSOF and pktType that are held by TimTable.

Figure 12:
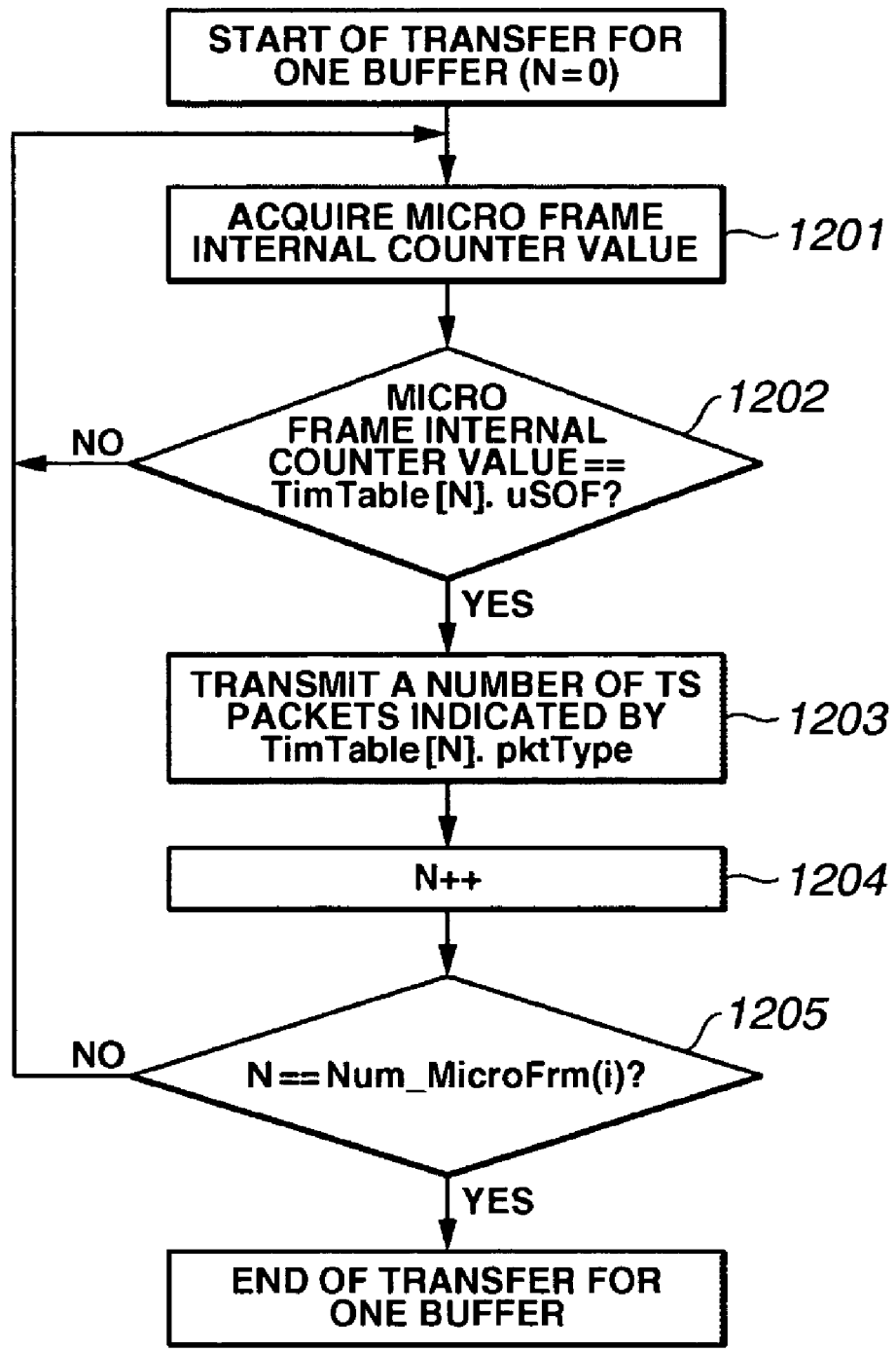
FIG. 12 is a flow chart illustrating transfer processing that is performed at a USB interface portion included in the transfer apparatus on the transmitting end according to the embodiment of the invention.

FIG. 12 is a flow chart illustrating transfer processing performed by the USB interface portion 606.

At step 1201, the USB interface portion 606 acquires a micro frame internal counter value that is counted in units of 125 μs.

At step 1202, the USB interface portion 606 checks to determine if the micro frame internal counter value coincides with a value indicated by TimTable[N].uSOF. If not, the USB interface portion 606 returns to step 1201, where the USB interface portion 606 acquires the micro frame internal counter value again. If so, the USB interface portion 606 proceeds to step 1203.

At step 1203, the USB interface portion 606 transmits, onto the bus, a number of TS packets indicated by TimTable[N].pktType as one USB isochronous packet.

At step 1204, the USB interface portion 606 increments N, which is an index of TimTable.

At step 1205, the USB interface portion 606 checks to determine if transmitting all TS packets temporarily stored in the buffer 604a, 604b or 604c has been completed. If not, the USB interface portion 606 returns to step 1201. If so, the USB interface portion 606 ends transfer for one buffer. Then, the USB interface portion 606 connects the second buffer selection portion 605 to the next buffer to perform the next data transmission.

Figure 13:
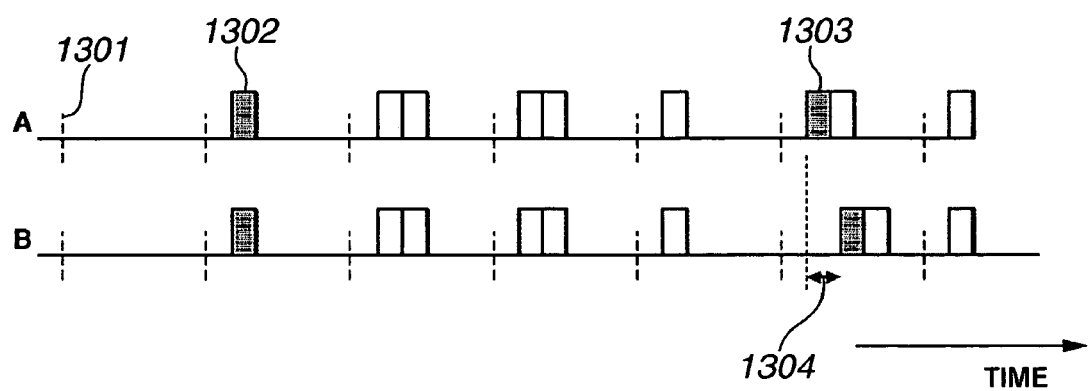
FIG. 13 is a diagram illustrating timing for transmitting TS packets according to the embodiment of the invention.

The DVC 501, which is a transfer apparatus on the receiving end, receives TS packets at the SIE-FIFO 802. Then, the DVC 501 transfers the TS packets to the CPU-FIFO 801 to transmit them to the internal bus. Line A in FIG. 13 shows the state of transmission of TS packets on USB micro frames. The TS packets on the line A include a uSOF packet 1301 and TS packets 1302 and 1303 each containing a PCR. Each PCR has a value that has been modified to set an interval between PCRs to an integral multiple of 125 μs. In the state shown on the line A in FIG. 13, an interval between each uSOF packet and each TS packet is constant. Accordingly, a time interval between PCRs of the TS packets 1302 and 1303 is equal to the actual transmission interval.

Line B in FIG. 13 shows also the state of transmission of TS packets on USB micro frames. In the case of this state, the TS packet 1303 containing a PCR has a delay 1304. Accordingly, a deviation occurs in an interval between PCRs.

Figure 14:
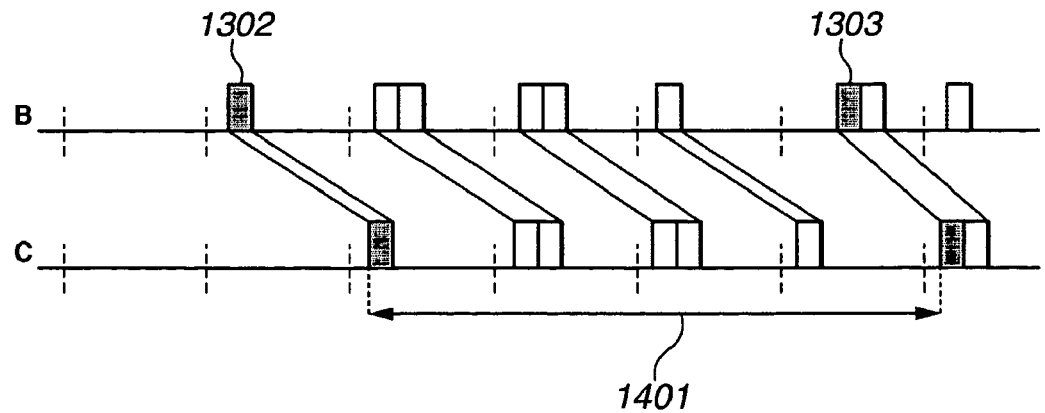
FIG. 14 is a diagram illustrating timing for transmitting TS packets according to the embodiment of the invention.

Therefore, as shown on line C in FIG. 14, transfer of TS packets from the CPU-FIFO 802 to the internal bus is performed in synchronization with a uSOF packet that is received next. In doing so, a delay or deviation occurring in each micro frame is absorbed. Accordingly, the actual transmission interval 1401 becomes equal to a time interval between PCRs of the TS packets 1302 and 1303. Thus, the transfer apparatus on the receiving end transmits data stored in the CPU-FIFO 801 to the internal bus in synchronization with each uSOF packet, so that a time interval between PCRs that has been changed to an integral multiple of 125 μs can be accurately reproduced.

As described above, according to the present embodiment, a transfer apparatus on the transmitting end transmits a data stream such that a time interval between PCRs becomes an integral multiple of 125 μs. Accordingly, in a transfer apparatus on the receiving end, a buffer memory for timing adjustment can be reduced in size. As a result, production cost of the transfer apparatus on the receiving end can be lowered.

Furthermore, according to the present embodiment, timing for transferring received TS packets to the MPEG2TS codec 702 can be adjusted according to uSOF. Accordingly, any time lag occurring in 125 μs can be absorbed.

The present invention can be applied to communication systems other than USB-compliant systems, as long as they have a transfer method for transferring predetermined-sized data at a predetermined time interval. For example, the present invention can be applied to a communication system compliant with the IEEE 1394 standard.

The present invention can also be achieved by providing a system or apparatus with a storage medium that stores a program code of software for implementing the functions of the above-described embodiment, and causing a computer (or a CPU, MPU or the like) of the system or apparatus to read the program code from the storage medium and then to execute the program code.

In this case, the program code itself read from the storage medium implements the functions of the embodiment, and a storage medium storing the program code and a program containing the program code each constitute the invention.

The storage medium for providing the program code includes, for example, a flexible disk, a hard disk, an optical disk, a magneto-optical disk, a CD-ROM, a CD-R, a magnetic tape, a non-volatile memory card, a ROM, etc.

Furthermore, besides the program code read by the computer being executed to implement the functions of the above-described embodiment, the present invention includes an OS (operating system) or the like running on the computer performing an actual process in whole or in part according to instructions of the program code to implement the functions of the above-described embodiment.

Moreover, the present invention can also include a CPU or the like contained in a function expansion board inserted into the computer or in a function expansion unit connected to the computer, the function expansion board or the function expansion unit having a memory in which the program code read from the storage medium is written, the CPU or the like performing an actual process in whole or in part according to instructions of the program code to implement the functions of the above-described embodiment.

The above-described embodiments are merely exemplary of the present invention, and are not to be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

This application claims priority from Japanese Patent Application No. 2004-026142 filed Feb. 2, 2004, which is hereby incorporated by reference herein.

What is claimed is:

1. A transfer apparatus comprising:
   a detecting unit configured to detect first time adjustment information from a first transport stream (TS) packet included in an MPEG-2 transport stream, and to detect second time adjustment information from a second TS packet included in the MPEG-2 transport stream;
   a calculation unit configured to calculate a time interval between the first time adjustment information and the second time adjustment information;
   a recalculation unit configured to perform a recalculation to change the time interval calculated by the calculation unit to a recalculated time interval;
   a transmission timing calculation unit configured to calculate transmission timing of the first TS packet and TS packets between the first and second TS packets, in accordance with the recalculated time interval; and
   a transfer unit configured to transfer the first TS packet and the TS packets between the first and second TS packets, in accordance with the transmission timing calculated by the transmission timing calculation unit.

2. A transfer apparatus according to claim 1, wherein the first time adjustment information and the second time adjustment information are a program clock reference (PCR).

3. A transfer apparatus according to claim 1, wherein the transfer unit conforms to Universal Serial Bus standard.

4. A transfer apparatus according to claim 1, wherein the recalculation unit changes the time interval calculated by the calculation unit to the recalculated time interval so that the recalculated time interval becomes an integral multiple of 125 microseconds.

5. A transfer apparatus according to claim 4, wherein the first time adjustment information and the second time adjustment information are a program clock reference (PCR).

6. A transfer apparatus according to claim 4, wherein the transfer unit conforms to Universal Serial Bus standard.

7. A method of controlling a transfer apparatus, the method comprising:
   detecting first time adjustment information from a first transport stream (TS) packet included in an MPEG-2 transport stream;
   detecting second time adjustment information from a second TS packet included in the MPEG-2 transport stream;
   calculating a time interval between the first time adjustment information and the second time adjustment information;
   performing a recalculation to change the calculated time interval to a recalculated time interval;
   calculating transmission timing of the first TS packet and TS packets between the first and second TS packets, in accordance with the recalculated time interval; and
   transferring the first TS packet and the TS packets between the first and second TS packets, in accordance with the calculated transmission timing.

8. A method according to claim 7, wherein the first time adjustment information and the second time adjustment information are a program clock reference (PCR).

9. A method according to claim 7, wherein the first TS packet and the TS packets between the first and second TS packets are transferred through a transfer unit that conforms to Universal Serial Bus standard.

10. A method according to claim 7, wherein the calculated time interval is changed to the recalculated time interval so that the recalculated time interval becomes an integral multiple of 125 microseconds.

11. A method according to claim 10, wherein the first time adjustment information and the second time adjustment information are a program clock reference (PCR).

12. A method according to claim 10, wherein the first TS packet and the TS packets between the first and second TS packets are transferred through a transfer unit that conforms to Universal Serial Bus standard.

* * * * *